March 26, 1940.　　J. C. McCUNE　　2,194,764
BRAKE MECHANISM
Filed Jan. 20, 1938　　3 Sheets-Sheet 3
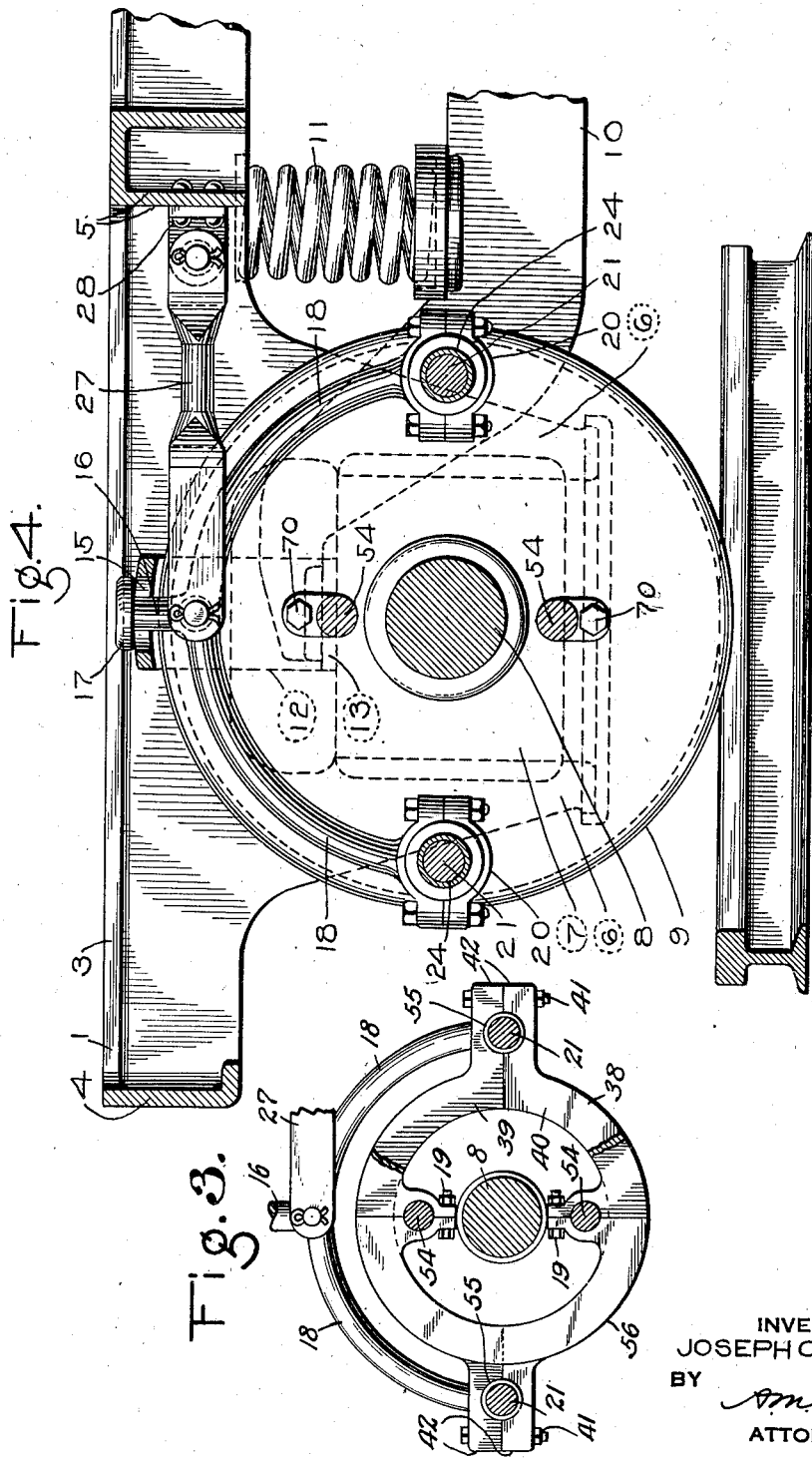
INVENTOR
JOSEPH C. McCUNE
BY
ATTORNEY Patented Mar. 26, 1940

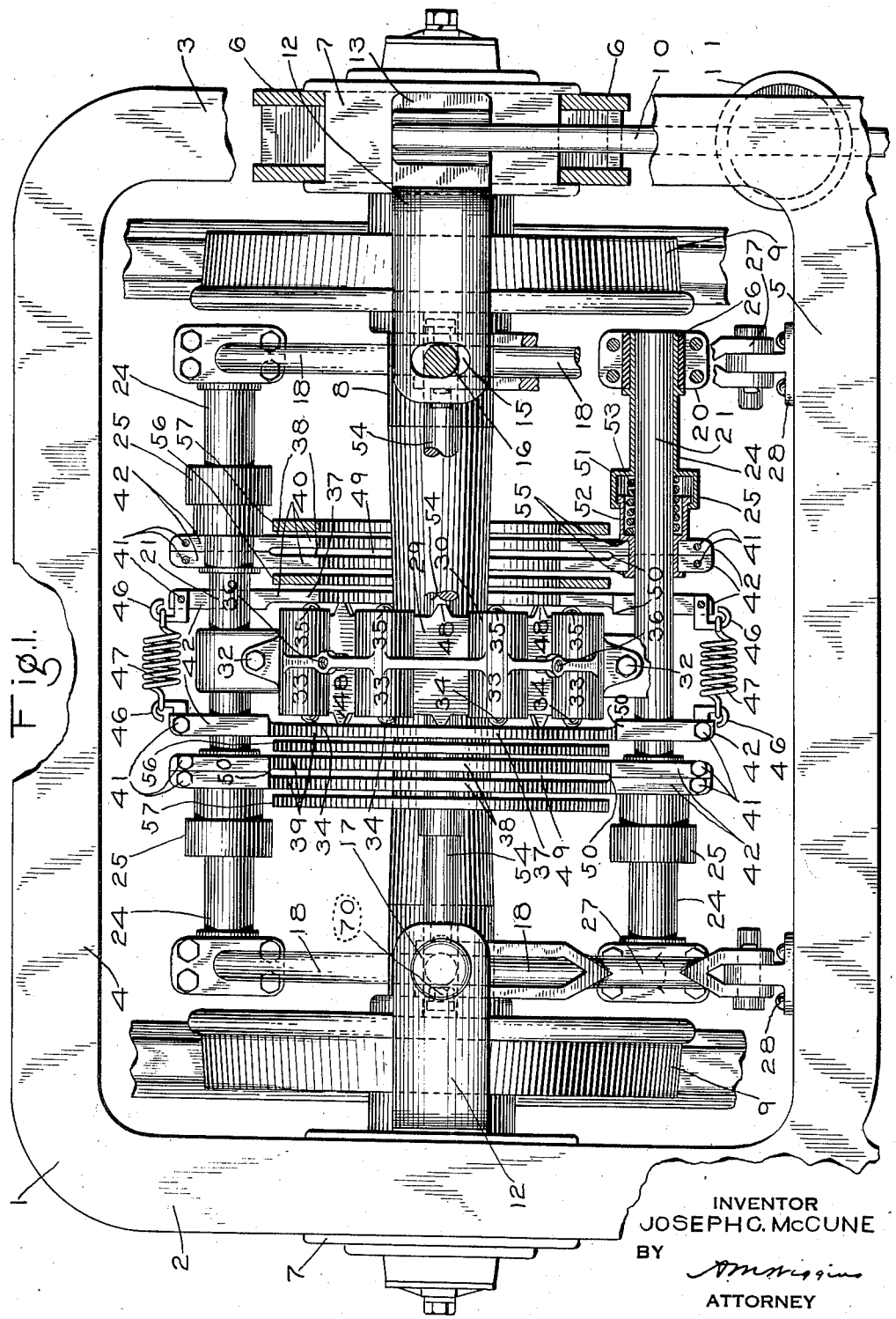

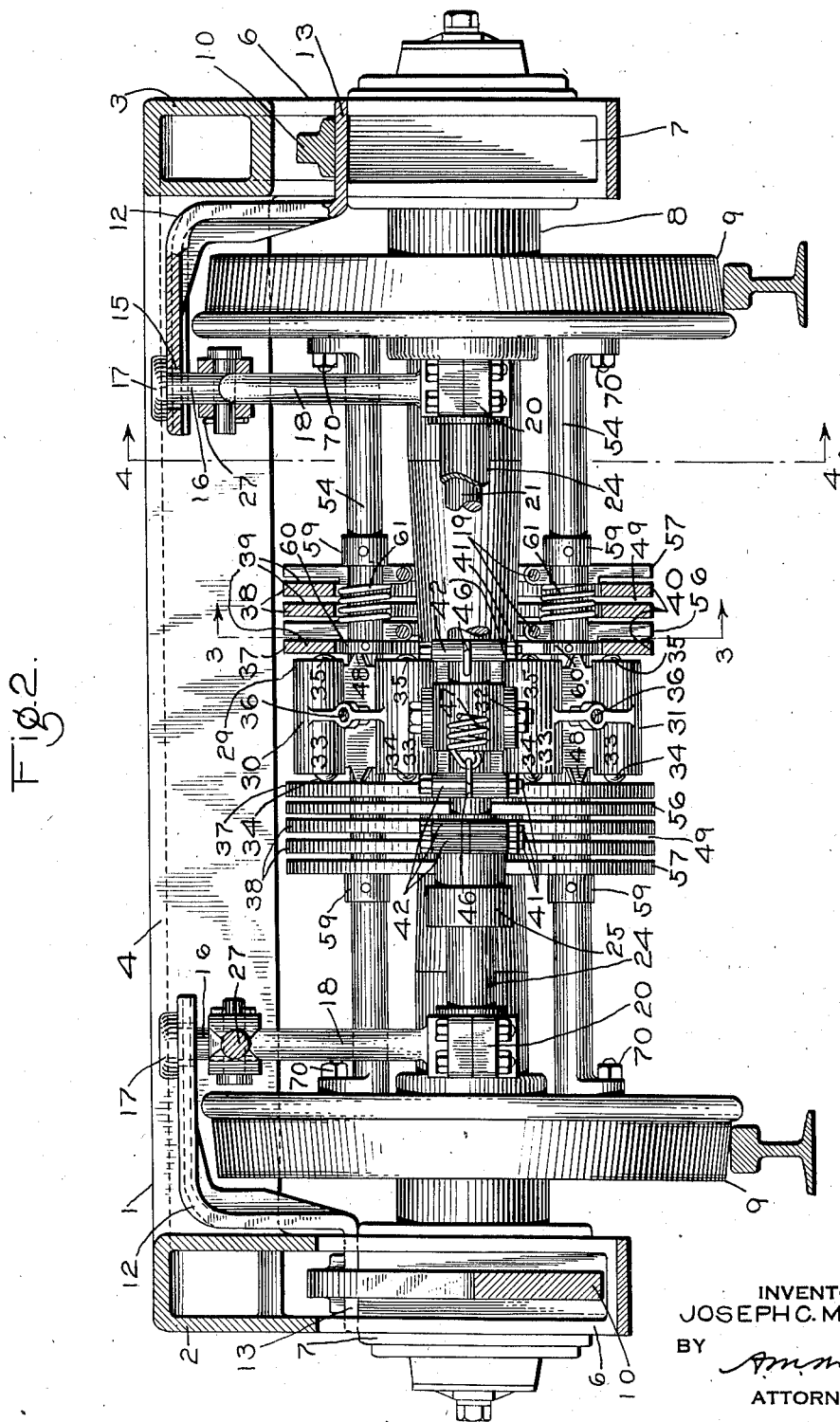

2,194,764

UNITED STATES PATENT OFFICE 2,194,764

BRAKE MECHANISM

Joseph C. McCune, Edgewood, Pa., assignor to The Westinghouse Air Brake Company, Wilmerding, Pa., a corporation of Pennsylvania Application January 20, 1938, Serial No. 185,823

23 Claims. (Cl. 188—59)

This invention relates to brake mechanism for railway vehicles or the like and more particularly to the friction disk type for use on wheel and axle assemblies of vehicle trucks.

In my pending application Serial No. 185,179 filed January 15, 1938, there is disclosed a brake mechanism of the above general type encircling a wheel and axle assembly and carried at either end by spool like elements encircling and independent of the axle and secured to the inner faces of the two wheels. By this construction the axle is relieved of substantially all of the weight of the mechanism and of braking torque developed in said mechanism for application to the wheels when an application of the brakes is effected, thereby reducing to a very low degree the possibility of axle breakage or loosening of the axle in the wheels due to the weight and braking action of the mechanism.

The above described mechanism comprises interleaved annular rotatable and non-rotatable friction braking elements and a brake cylinder device for moving said elements into frictional contact with each other, the non-rotatable elements and brake cylinder device being carried by a structure which is journaled at opposite ends on the spool like elements secured to the wheels, and one object of the present invention is to provide an improved construction in which these journals are eliminated.

Another object of the invention is to provide an improved brake construction of the above general type in which the non-rotatable elements and brake cylinder device are supported on the axle bearings of the wheel and axle assembly, thereby obviating the need for additional bearings or journals such as employed in the above described construction.

A still further object of the invention is to provide improved supporting means for the non-rotatable elements and brake cylinder device of a disk brake mechanism such as above described which comprises brackets interposed between the top of the usual journal boxes, directly over the axle bearings, and the ends of the usual equalizer bars on vehicle trucks, the weight carried by said bars being adapted to securely hold said brackets in position.

Other objects and advantages will be apparent from the following more detailed description of the invention.

In the accompanying drawings: Fig. 1 is a plan view, partly in section, of a portion of a railway vehicle truck embodying the invention; Fig. 2 is an end view, partly in section, of the truck and brake mechanism shown in Fig. 1; and Figs. 3 and 4 are sectional views taken on the lines 3—3 and 4—4 in Fig. 2; Fig. 3 being at a somewhat reduced scale.

As shown in the drawings the invention is embodied in a railway vehicle truck which may comprise a truck frame 1 of any desired construction but which for the purpose of illustration is of the cast type having spaced parallel side frames 2 and 3 connected at their ends by transversely extending end members 4 and adjacent the transverse center line of the truck said frames are connected together by spaced, parallel, transversely extending transoms 5, only one end piece and transom being shown.

The side frames 2 and 3 are provided with the usual integral truck pedestals 6 and slidably mounted in these pedestals in the usual manner are journal boxes 7 in which are rotatably mounted the ends of an axle 8, and secured to said axle in any suitable manner and in the usual spaced relation are wheels 9. The truck is preferably of the type in which there is provided at each side an equalizer bar 10 extending between the journal boxes 7 and resting on the tops thereof, and upon which there are provided springs 11 for supporting the frame 1. Only one wheel and axle assembly and the associated journal boxes and one end of the equalizer bars at either side of the truck are shown in the drawings as these parts are deemed sufficient for a clear understanding of the invention.

According to the invention there is provided at each side of the truck a bracket 12 extending upwardly from the journal boxes 7, preferably between the adjacent wheel 9 and side frame, and over the top of the wheel to a point beyond the inner faces thereof. These brackets are oppositely disposed and rigidly secured to the journal boxes 7 in any desired manner, but preferably by the provision of a foot 13 at the lower end of the brackets interposed between the upper surface of the journal boxes 7 and the equalizing bars 10, whereby the weight carried by the equalizer bars is adapted to hold said brackets rigidly in place.

The inner end of each of the brackets 12 is preferably arcuate in shape concentric with the adjacent wheel 9 and is provided with a slot 15 extending in the direction of the circumference of the arc. A bar 16 is slidably mounted in each slot 15 and is provided on the upper end with a head 17 adapted to slidably engage the upper surface of the bracket 12 for supporting said bar. Secured to and supported by the lower end of each of the bars 16 are a pair of oppositely disposed and similar arms 18 extending downwardly on opposite sides of the axle 8. In the lower end of each of the arms 18 there is provided a bore half of which is in a removable member 20, and clamped in the bores in the two arms adjacent one wheel are the ends of two rods 21, the opposite ends of which are clamped in the arms 18 adjacent the opposite wheel. These rods are, as will be evident from the drawings, disposed diametrically opposite each other at opposite sides of the axle 8 and extend parallel with the axis of said axle and are supported at opposite ends by the brackets 12.

Encircling that portion of each of the rods 21 which is secured in the end of the arms 18 is the sleeve portion 24 of a spring cage 25 which sleeve portion is in turn encircled by a shock absorbing bushing 26 of rubber or the like, the several cages and bushings being securely clamped in the end of arms 18.

An annular brake cylinder device 29 comprising upper and lower complementary, segmental sections 30 and 31 is disposed substantially mid-way between the wheels 9 in concentric relation to said wheels and encircling the axle 8, the two sections of said brake cylinder device being rigidly clamped together and to the diametrically opposite rods 21 by means of bolts 32.

Each of the portions 30 and 31 of the brake cylinder device is provided with a plurality of spaced small brake cylinders 33 arranged radially around the axle 8 and with their axes arranged parallel to the axis of said axle. Each of the brake cylinders 33 contains two circular, oppositely acting pistons (not shown) which are adapted to be moved outwardly in opposite directions parallel to the axis of axle 8 by fluid under pressure to effect an application of the brakes, and which are adapted to be moved inwardly toward each other upon the release of fluid under pressure, to effect a release of the brakes. One piston in each brake cylinder has a stem 34 projecting slightly beyond one side of the brake cylinder device while the other piston in said brake cylinder has a like stem 35 projecting slightly beyond the opposite face of said device. The several brake cylinders 33 are connected together in pairs of fluid conduits 36 leading to the exterior of the brake cylinder device and through which fluid under pressure is adapted to be supplied to and released from said brake cylinders in any desired manner.

The brake cylinder and piston arrangement just described may, if desired, be the same as that fully disclosed in the aforementioned pending application and in view of this and the fact that the piston stems 34 and 35 are shown, further detailed showing of this arrangement is not deemed essential to a clear understanding of the invention and has therefore been omitted.

A pair of annular non-rotatable disk-like friction braking elements 37 and 38 are provided at each side of the brake cylinder device 29 in parallel relation to each other and to said device. Each of the elements 37 and 38 are formed in complementary sections 39 and 40 which are rigidly secured together by bolts 41 extending through suitable openings provided in outwardly extending projections 42 which are thickened as indicated at 50 and which are slidably mounted on the rods 21.

A hook 46 is provided in the end of each of the projections 42 of the braking elements 37 and a spring 47 under tension is connected to the adjacent hooks 46, the springs 47 acting to pull the elements 37 towards the opposite sides of the brake cylinder device 29 into engagement with spaced stops 48 thereon which define the brake release position of the two elements.

The braking element 38 is formed by securing together as a unit two elements like the braking element 37, the two elements being oppositely disposed so that the thickened portions 50 engage to provide a clearance space 49 between said elements for the passage of heat dissipating air currents.

Each of the spring cages 25 comprises two telescopic parts 51 and 52, the part 51 being formed integral with sleeve 24, while the part 52 has at one end an out-turned collar slidably mounted within the part 51 and adapted to engage an in-turned collar on part 51 for limiting outward movement thereof relative to the part 51. A spring 53 is provided in each spring cage 25 encircling the bar 21 and acting on the two parts of said cage for urging them apart and for opposing collapse thereof.

The parts 52 of the spring cages 25 each have an outer portion of reduced diameter slidable on the rods 21 and extending through suitable bores in the adjacent projections 42 of the two parts of the brake elements 38, outwardly flaring flanges 55 being provided at each end of said portions of reduced diameter engaging the outer faces of said projections for rigidly securing the two parts of the brake elements 38 together and to the portions 52 of the spring cages 25. The brake elements 38 are thereby movable with portions 52 of the spring cages 25 and when said portions of the cages are moved to their outermost position by springs 53, the release position of the brake elements 38 is obtained.

The non-rotatable brake elements 37 and 38 and the brake cylinder device 29, all of which are arranged concentric with the wheels 9, encircle two diametrically opposite parallel rods 54 which are equally spaced on either side of the axle 8 and which are secured at their opposite ends to the wheels 9 in any suitable manner as by means of bolts 70 extending through out-turned toes at the ends of said rods and secured in the wheels.

A pair of annular disk like rotatable friction brake elements 56 and 57 are provided at both sides of the brake cylinder device 29, in cooperative relation with the non-rotatable elements 37 and 38, one of the elements 56 being disposed between each pair of non-rotatable elements 37 and 38, and one of the elements 57 being disposed at the outer face of each of the elements 38. The elements 56 and 57 encircle the rods 54 and are formed in two complementary parts secured together by bolts 19 provided through inwardly projecting extensions of said parts which are slidable on said rods.

Collars 59 are secured to the rods 54 and are adapted to be engaged by the rotatable brake elements 57 for holding said elements in a fixed braking position in which space exists between said elements and the adjacent elements 38, when the caged springs 53 are expanded. Collars 60 are also provided on the bars 54 for engagement by the rotatable elements 56 to hold said elements disengaged from the adjacent elements 37 and 38 when in their release position, as above described. Springs 61 are provided on the rods 54 and act on the elements 56 and 57 for urging said elements into engagement with the collars 59 and 60.

The non-rotatable brake elements 37 and 38, the rotatable elements 56 and 57, the spring cages 25 and the means for moving said elements to and defining their brake release positions may, in so far as the present invention is concerned, be the same as disclosed in my aforementioned pending application.

From the above description it will be noted that only the rotatable elements 56 and 57 and the rods 54 upon which said elements are mounted are carried by the wheels, the non-rotatable elements 37 and 38 and the brake cylinder device 29 being supported through the rods 16 and brackets 12 on the journal boxes 7 and therefore directly over the bearings of axle 8 in said boxes.

A torque rod 27 is provided at each side of the truck, each of said rods being pivotally connected at one end to the adjacent support bar 16 at the junction with arms 18 and being pivotally connected at the opposite end to a bracket 28 secured to any suitable portion of the truck such as the transom 5. These rods are provided to hold the non-rotatable elements 37 and 38 against rotation with the rotatable elements 56 and 57 when an application of the brakes is effected as will be hereinafter described, it being noted that under such conditions force will be transmitted to said rods through the arms 18, but such force will not be applied to the support rods 16, the slots 15 being provided in the brackets to permit rods 16 to freely move in said brackets during braking.

In operation, let it be assumed that the several braking elements 37, 56, 38 and 57 are disengaged and that the wheels 9 are revolving on a trackway in the usual manner and that it is desired to brake said wheels. In order to thus brake the wheels 9 fluid under pressure is supplied to the several brake cylinders 33 through the conduits 36 in any desired manner, and the pistons (not shown) in said brake cylinders are thereby operated to move the several piston rods 34 and 35 outwardly in opposite directions.

During this movement the several piston rods first contact the braking elements 37 and slide said elements along the rods 21 into frictional engagement with the rotatable brake elements 56. The elements 56 are then picked up and slid along the rods 54 into frictional engagement with the non-rotatable braking elements 38 which in turn are picked up and slid on the bars 21 into frictional engagement with the rotatable elements 57. After the several braking elements are thus moved into frictional engagement they are pressed together with a force equal to the pressure of fluid acting on the several pistons (not shown) in the several brake cylinders 33 which results in braking of the rotatable elements 56 and 57, and since said rotatable elements are connected through the rods 54 to the wheels 9 the wheels 9 are also braked and caused to slow down or stop. When an application of the brakes is effected as just described it will be evident that springs 47 will be stretched and that the springs 53 and 61 will be compressed.

When it is desired to effect a release of the brakes after an application, fluid under pressure is released from the several brake cylinders 33 thus relieving the force on the braking elements 37, 38, 56 and 57, following which the springs 47, 53 and 61 return said elements to their release position out of engagement with each other.

While braking the wheels 9 it will be evident that the torque rods 27 act to hold the non-rotatable braking members 37 and 38 against rotation.

The truck frame being supported from the journal boxes 7 by springs 11 will move to different vertical positions relative to the wheels 9 due for instance to changes in load carried by the truck, and upon such movement will act through the torque rods 27 to turn to a slight degree the bars 24 and the brake cylinder device 29 and non-rotatable braking elements 37 and 38 relative to the braking elements 56 and 57. During such turning movement however the head 17 on the end of the bar 16 will slide on the arcuate surface of the brackets 12 concentrically with the wheels 9, so that the brake cylinder device 29 and braking elements 37 and 38 will remain in substantially concentric braking relation with the braking elements 56 and 57, it being noted that the slots 15 in brackets 12 are sufficiently long to insure that in all vertical positions of the truck frame 1 the torque rods 27, and not the brackets 12, will act to hold the non-rotatable elements 37 and 38 against rotation when an application of the brakes is effected, as herebefore described.

While one embodiment of the invention has been described in detail it is not the intention to limit its scope to that embodiment or otherwise than by the terms of the appended claims.

Having now described my invention, what I claim as new and desire to secure by Letters Patent, is:

1. A brake mechanism for a vehicle truck provided with a pair of wheels having journals and journal boxes for said journals, said mechanism comprising an annular rotatable friction brake element, means carried by said wheels for supporting said element to rotate with said wheels, an annular non-rotatable friction brake element disposed in cooperative relation with said rotatable element, an unsprung structure extending between and carried by said journal boxes supporting said non-rotatable element, means for securing said non-rotatable element against rotation with said wheels, and brake cylinder means carried by said structure in cooperative relation with said elements for effecting movement of said elements into frictional engagement.

2. A brake mechanism for a vehicle truck provided with a pair of wheels, an axle for said wheels and journal boxes in which said axle is journaled, said brake mechanism comprising a plurality of annular rotatable friction brake elements, means carried by said wheels for supporting said elements to rotate with said wheels, a plurality of non-rotatable friction brake elements disposed in interleaved cooperative relation with said rotatable elements, a structure carried by said journal boxes and extending between said wheels and straddling said axle, means disposed at each of the opposite sides of the axle carried by the straddling portion of said structure for supporting said non-rotatable elements, and means for controlling movement of said elements into and out of frictional engagement.

3. A brake mechanism for a vehicle truck provided with a pair of wheels, an axle for said wheels, and journal boxes in which said axle is journaled, said mechanism comprising an annular rotatable friction brake element, means carried by said wheels for supporting said element to rotate with said wheels, an annular non-rotatable friction brake element, unsprung means supporting said non-rotatable friction element on said journal boxes in cooperative relation with said rotatable element and arranged to permit axial movement of said non-rotatable element, means connected to said non-rotatable element for securing same against rotation, and means for controlling movement of said elements into and out of frictional engagement.

4. A brake mechanism for a vehicle truck provided with a pair of wheels, an axle for said wheels and journal boxes in which said axle is journaled, said mechanism comprising an annular rotatable friction brake element, means carried by said wheels for supporting said element to rotate with said wheels, a structure carried by said journal boxes and having an arcuate surface concentric with said wheels, an annular non-rotatable friction brake element, means slidable on said surface in the direction of curvature thereof supporting said non-rotatable friction element in cooperative relation with said rotatable element, means securing said non-rotatable element against rotation, and means for controlling movement of said elements into and out of frictional engagement.

5. A brake mechanism for a vehicle truck provided with a pair of wheels, an axle for said wheels and journal boxes in which said axle is journaled, said mechanism comprising an annular rotatable friction brake element, means carried by said wheels for supporting said element to rotate with said wheels, brackets secured to the top of said journal boxes, an annular non-rotatable braking element carried by said brackets in cooperative relation with said rotatable element, and means for controlling movement of said elements into and out of frictional engagement.

6. A brake mechanism for a vehicle truck provided with a pair of wheels, an axle for said wheels, journal boxes in which said axle is journaled and equalizer bars carried on the tops of said journal boxes, said brake mechanism comprising an annular rotatable friction brake element, means carried by said wheels for supporting said element to rotate with said wheels, a bracket rigidly clamped between the top of each of said journal boxes and said equalizer bars, an annular non-rotatable braking element supported by said brackets in cooperative relation with said rotatable element, and means for controlling movement of said elements into and out of frictional engagement.

7. A brake mechanism for a vehicle truck provided with a pair of wheels, an axle for said wheels, and journal boxes in which said axle is journaled, said mechanism comprising an annular rotatable friction brake element, means carried by said wheels for supporting said element to rotate with said wheels, an annular non-rotatable friction brake element, a structure supported on the axle journals carrying said non-rotatable element in cooperative relation with said rotatable element, means for controlling movement of said elements into and out of frictional engagement and means independent of said structure for holding said non-rotatable element against rotation, whereby said structure is not subjected to braking torque when said elements are in frictional engagement.

8. A brake mechanism for a vehicle truck provided with a pair of wheels, an axle for said wheels and journal boxes in which said axle is journaled, said brake mechanism comprising an annular rotatable friction brake element, means carried by said wheels for supporting said element to rotate with said wheels, a non-rotatable annular friction brake element disposed in cooperative relation with said rotatable element, means for controlling movement of said elements into and out of frictional engagement, a pair of spaced bars carrying said non-rotatable element, and unsprung means connected to said journal boxes carrying said bars.

9. A brake mechanism for a vehicle truck provided with a pair of wheels, an axle for said wheels and journal boxes in which said axle is journaled, said brake mechanism comprising an annular rotatable friction brake element and an annular non-rotatable friction brake element disposed between said wheels in cooperative relation, means carrying said rotatable element and secured to said wheels for rotating said rotatable element with said wheels, a bracket rigidly secured to each of said journal boxes extending from outside the adjacent wheel over the top of and beyond the inner face thereof, means carried by the inner ends of said brackets supporting said non-rotatable element, and means for controlling movement of said elements into and out of frictional engagement.

10. A brake mechanism for a vehicle truck provided with a pair of wheels, an axle for said wheels and journal boxes in which said axle is journaled, said brake mechanism comprising an annular rotatable friction brake element and an annular non-rotatable friction brake element disposed between said wheel in cooperative relation, means carrying said rotatable element and secured to said wheels for rotating said rotatable element with said wheels, a bracket rigidly secured to each of said journal boxes extending from outside the adjacent wheel over the top of and beyond the inner face thereof, the inner portion of said brackets being arcuate in shape concentric with said wheels and having a slot extending in the direction of the curvature, means slidable in said slots and engaging the arcuate surface of said brackets and supporting said non-rotatable element, means securing said non-rotatable element against rotation, and means for controlling movement of said elements into and out of frictional engagement.

11. A brake mechanism for a vehicle truck provided with a pair of wheels, an axle for said wheels, journal boxes in which said axle is journaled, and a truck frame comprising side members disposed outside of said wheels and supported on said journal boxes, said brake mechanism comprising an annular rotatable friction brake element disposed between said wheels, an annular non-rotatable friction brake element disposed in cooperative relation with said rotatable element, means for controlling movement of said elements into and out of frictional engagement, means securing said rotatable element to said wheels for rotation therewith, a bracket disposed between each of said side members and the adjacent wheel and secured to the adjacent journal boxes, and means carried by said brackets supporting said non-rotatable element.

12. A brake mechanism for a vehicle truck provided with a pair of wheels, an axle for said wheels, journal boxes in which said axle is journaled, equalizer bars carried by said journal boxes and a truck frame carried by said equalizer bars and comprising side members disposed outside of said wheels, said brake mechanism comprising an annular rotatable friction brake element disposed between said wheels, an annular non-rotatable friction brake element disposed in cooperative relation with said rotatable elements, means for controlling movement of said elements into and out of frictional engagement, means securing said rotatable element to said wheels for rotation therewith, and a bracket disposed between each of said side members and the adjacent wheel supporting said non-rotatable element, each of said brackets having a portion rigidly clamped between the adjacent journal box and equalizer bar.

13. A brake mechanism for a vehicle truck provided with a pair of wheels, an axle for said wheels, and journal boxes in which said axle is journaled, said mechanism comprising a plurality of interleaved rotatable and non-rotatable annular friction brake elements disposed between said wheels in concentric relation therewith, a fluid pressure operated brake cylinder device disposed in cooperative relation to said elements and operative by fluid under pressure to move said elements into frictional engagement, means carried by said wheels for supporting said rotatable elements to rotate with said wheels, and unsprung means supported on said wheel journals carrying said non-rotatable elements and brake cylinder device.

14. A brake mechanism for a vehicle truck provided with a pair of wheels, an axle for said wheels, and journal boxes in which said axle is journaled, said mechanism comprising a plurality of interleaved rotatable and non-rotatable annular friction brake elements disposed between said wheels in concentric relation therewith, means for controlling movement of said elements into and out of frictional engagement, means carried by said wheels for supporting said rotatable elements to rotate with said wheels, a pair of rods disposed on opposite sides of said elements and supporting said non-rotatable elements, a pair of oppositely disposed brackets carried by said journal boxes, and means supported by said brackets and carrying said rods.

15. A brake mechanism for a vehicle truck provided with a pair of wheels, an axle for said wheels, and journal boxes in which said axle is journaled, said mechanism comprising a plurality of interleaved rotatable and non-rotatable annular friction brake elements disposed between said wheels in concentric relation therewith, means for controlling movement of said elements into and out of frictional engagement, means carried by said wheels for supporting said rotatable elements to rotate with said wheels, means carried by said journal boxes and movable circumferentially of said wheels and supporting said non-rotatable braking elements, and means securing said non-rotatable elements against rotation with said rotatable elements.

16. A brake mechanism for a vehicle truck provided with a pair of wheels, an axle for said wheels, journal boxes in which said axle is journaled, and a truck frame comprising side members disposed outside of said wheels and supported on said journal boxes, said brake mechanism comprising a plurality of interleaved rotatable and non-rotatable friction brake elements, means for controlling movement of said elements into and out of frictional engagement, means carried by said wheels for supporting said rotatable elements to rotate with said wheels, means carried by said journal boxes supporting said non-rotatable elements and having limited movement in a direction circumferentially of said wheels, and rigid means pivotally connected to the last named supporting means and frame for holding said non-rotatable elements against rotation with said rotatable elements.

17. In combination with a truck having spaced side frames, a wheel and axle assembly, the axle of which assembly is journalled in said side frames, interleaved rotatable and non-rotatable brake elements located between the wheels of said assembly, actuating means located between said wheels for causing said rotatable and non-rotatable elements to frictionally engage each other, said rotatable elements being carried by said wheels, and unsprung means supported by the journalled portions of said axle and carrying said non-rotatable elements and actuating means.

18. In combination with a truck having spaced side frames, a wheel and axle assembly, the axle of which assembly is journaled in said side frames, a rotatable and non-rotatable brake element located between the wheels of said assembly, actuating means located between said wheels for causing said rotatable and non-rotatable elements to frictionally engage each other, and a structure resting on the journaled portions of said axle and bridging each wheel, said structure between said wheels being depressed into the plane of and straddling said axle, and means at each of the opposite sides of said axle, carried by the straddling portion of said structure carrying said non-rotatable element and actuating means.

19. In a brake mechanism for a wheel and axle assembly of a railway vehicle truck having truck frame supporting members carried by said axle outside of the wheels and having a truck frame supported on said supporting members, in combination, a brake mechanism comprising a plurality of interleaved rotatable and non-rotatable annular and axially movable friction braking elements, a set of rods circumferentially spaced and secured to rotate with said wheels for supporting said rotatable friction braking elements, another set of rods circumferentially spaced and carried by said members for supporting said non-rotatable elements, and brake cylinder means carried by said members for actuating said elements.

20. In a brake mechanism for a wheel and axle assembly of a railway vehicle truck having truck frame supporting members carried by said axle outside of the wheels and having a truck frame supported on said supporting members, in combination, a brake mechanism comprising a plurality of interleaved rotatable and non-rotatable annular and axially movable friction braking elements, a set of rods circumferentially spaced and secured to rotate with said wheels for supporting said rotatable friction braking elements, another set of rods circumferentially spaced and carried by said members for supporting said non-rotatable elements, and an annular brake cylinder means located between said two sets of rods and operative to actuate said elements.

21. In a brake mechanism for a wheel and axle assembly of a railway vehicle truck having truck frame supporting members carried by said axle outside of the wheels and having a truck frame supported on said supporting members, in combination, a brake mechanism comprising a plurality of interleaved rotatable and non-rotatable annular and axially movable friction braking elements, a set of rods circumferentially spaced and secured to rotate with said wheels for supporting said rotatable friction braking elements, another set of rods circumferentially spaced and carried by said members for supporting said non-rotatable elements, and an annular brake cylinder means operatively engaging said elements between said sets of rods.

22. In a brake system for a railway vehicle truck comprising a wheel and axle assembly having two spaced wheels supporting the axle, in combination, two groups of interleaved rotatable and non-rotatable annular braking disks, the disks in each group being normally out of engagement and being movable axially into braking engagement, annular brake cylinder means comprising two annular piston arrangements each of which is operable to move one of said disk groups in an axial direction toward the adjacent wheel for producing a braking action, and truck frame supporting means supported at each end of said axle outside of each wheel for supporting said brake cylinder means.

23. In a brake system for a railway vehicle truck comprising a wheel and axle assembly having two spaced wheels supporting the axle, in combination, two groups of interleaved rotatable and non-rotatable annular braking disks, the disks in each group being normally out of engagement and being movable axially into braking engagement, a set of circumferentially spaced rods for supporting the rotatable braking disks from the vehicle wheels, another set of circumferentially spaced rods for supporting the non-rotatable braking disks from a portion of the truck frame resting directly on the axle, and brake cylinder means comprising two piston arrangements each of which actuates the disks of one group into braking engagement.

JOSEPH C. McCUNE.